(12) United States Patent
Nunamaker et al.

(10) Patent No.: US 7,284,092 B2
(45) Date of Patent: Oct. 16, 2007

(54) DIGITAL DATA PROCESSING APPARATUS HAVING MULTI-LEVEL REGISTER FILE

(75) Inventors: Nathan Samuel Nunamaker, Durham, NC (US); Jack Chris Randolph, Rochester, MN (US); Kenichi Tsuchiya, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/875,373

(22) Filed: Jun. 24, 2004

(65) Prior Publication Data

US 2005/0289299 A1    Dec. 29, 2005

(51) Int. Cl.
G06F 12/00 (2006.01)
G06F 13/00 (2006.01)

(52) U.S. Cl. ................................. 711/122; 711/167

(58) Field of Classification Search ............... None
See application file for complete search history.

(56) References Cited

U.S. PATENT DOCUMENTS

| | | |
|---|---|---|
| 4,128,880 A | 12/1978 | Cray |
| 5,179,681 A | 1/1993 | Jensen |
| 5,226,142 A | 7/1993 | Vegesna et al. |
| 5,701,507 A * | 12/1997 | Bonneau et al. ............... 716/8 |
| 5,721,868 A | 2/1998 | Yung et al. |
| 5,828,860 A * | 10/1998 | Miyaoku et al. ............ 712/207 |
| 5,974,438 A * | 10/1999 | Neufeld ....................... 718/104 |
| 2004/0064680 A1* | 4/2004 | Kadambi et al. ........... 712/218 |
| 2005/0132172 A1* | 6/2005 | Eichenberger et al. ...... 712/217 |

* cited by examiner

*Primary Examiner*—Hyung Sough
*Assistant Examiner*—Craig E Walter
(74) *Attorney, Agent, or Firm*—Roy W. Truelson (57) ABSTRACT

A processor contains multiple levels of registers having different access latency. A relatively smaller set of registers is contained in a relatively faster higher level register bank, and a larger, more complete set of the registers is contained in a relatively slower lower level register bank. Physically, the higher level register bank is placed closer to functional logic which receives inputs from the registers. Preferably, the lower level bank includes a complete set of all processor registers, and the higher level bank includes a smaller subset of the registers, duplicating information in the lower level bank. The higher level bank is preferably accessible in a single clock cycle.

1 Claim, 7 Drawing Sheets

DIGITAL DATA PROCESSING APPARATUS HAVING MULTI-LEVEL REGISTER FILE

FIELD OF THE INVENTION

The present invention relates to digital data processing hardware, and in particular to the design and operation of register files and supporting hardware for a processing unit of a digital data processing device.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip. The reduced size made it possible to increase the clock speed of the processor, and accordingly increase system speed.

Many design improvements in addition to clock speed have increased the throughput of computer systems, but the demand for ever faster clock speeds remains.

The clock speed selected for a particular processor design can be no faster than the slowest operation to be performed in a single clock cycle. This in turn is limited by logic circuit gate delays and transmission path delays. Many earlier processor designs were capable of executing a complete simple instruction of the processor's instruction set within one clock cycle, although complex instructions often required multiple cycles. Even a simple instruction requires a substantial number of gate delays for sequentially decoding, moving data, performing logical operations, and so forth. These gate delays limited the clock speeds of such processor designs. In order to support higher clock speeds, most modern processors use some form of pipelining for executing instructions. A pipeline breaks down an instruction into multiple sequential sub-parts, or stages. With each clock cycle, an instruction proceeds to the next stage of the pipeline. By thus breaking each instruction into multiple stages, the number of things which are done at each stage is reduced, meaning that the number of sequential gate delays of logic required for each stage is less than required for a complete instruction. A pipelined design therefore supports higher clock speeds by reducing the number of gate delays which must be accommodated in a clock cycle, although at a cost of additional hardware complexity.

While pipelining has substantially reduced the number of logic gate delays in each clock cycle, another major limitation on processor clock speed which has assumed a greater significance is the propagation delay inherent in the physical size and layout of processor chips. Typical modern clock speeds are so fast that it becomes difficult to propagate a signal from one part of the processor chip to a relatively distant part within a single clock cycle. If careful attention is paid to the layout, it may be possible to avoid many long signal paths, but it is unlikely that all long paths can be eliminated by good design. Layout becomes increasingly difficult as clocks speeds increase and processors become more complex. It may be necessary to accept that some signals will require multiple cycles to propagate within the chip. But if this concession is made routinely, the benefit of faster clock speeds is largely lost.

Among the critical paths involved in processing data are the retrieval of data from registers within the processor. The very purpose of registers is to hold data temporarily in a location where it can be retrieved with the highest speed. In most processor designs, this means register data is accessible in a single clock cycle. However, as processor designs become more complex, and include larger register files, the physical distance between registers and certain functional logic is difficult to maintain within a single clock cycle. Support for hardware multithreading, which typically means that the processor contains multiple program sets of registers, each supporting a respective thread, further increases the required size of register files. At the same time, increasing clock speeds provide less time to propagate data from the registers to the functional logic.

It would, of course, be possible to allow multiple clock cycles for register access, but since register access form such a critical part of the functions performed by the processor, this is likely to significantly affect processor performance, and would defeat the purpose of faster clock speeds. As the number of pipeline stages increases, more registers are required to hold intermediate results, further defeating efforts to improve clock speed.

As the demand for ever faster and more capable processors grows, it is likely that the challenges of intra-processor signal propagation, and in particular signal propagation involving register access, will increase. It is therefore desirable to find improved processor design techniques which will support increased clock speeds as well as larger and more complex processors.

SUMMARY OF THE INVENTION

A processor contains multiple levels of registers having different access latency. A relatively smaller set of the registers is contained in a relatively higher level register bank, having a relatively faster access latency time. A larger, more complete set of the registers is contained in a relatively lower level register bank, having a relatively slower access latency time. Physically, the higher level register bank is placed closer to functional logic which receives inputs from the registers, allowing signals to propagate to the functional logic more quickly. The lower level register bank is physically located more remotely from the functional logic.

In the preferred embodiment, the processor contains two levels of register banks, although more than two levels would be possible. The lower level bank includes a complete set of all processor registers. The higher level bank includes a smaller subset of the registers, and thus duplicates information in the lower level bank. The higher level bank is accessible in a single clock cycle, while access to the lower level bank requires multiple clock cycles for access.

In the preferred embodiment, the processor supports hardware multi-threading, and has a separate, independent register file corresponding to each thread. Each register file is divided into two levels, including a lower level bank containing a complete set of registers in the file, and a higher level bank including only a subset of the registers. The processor preferably contains two register files corresponding to two threads, although a different number would be possible.

Since the higher level register bank includes only a subset of the register data, it ideally includes the subset most likely to be accessed. A variety of techniques for managing data in the higher level register bank are possible. In the preferred embodiment, each higher level register corresponds to a fixed set of multiple lower level registers, and contains the contents of the most recently accessed lower level register of the set to which it corresponds. This technique does not necessarily obtain an optimal subset for the higher level bank, but it is extremely fast and simple to implement.

By establishing a multi-level register file, it is possible to place a relatively smaller high-level register bank sufficiently close to the functional logic to maintain single-cycle access. At the same time, a relatively large register file can be supported, since the entire file need not be next to the functional logic. Even with a simple mechanism for managing the subset of data in the high-level register, it is expected that a sufficiently large proportion of register accesses will be satisfied from data in the high-level register to provide a performance improvement.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
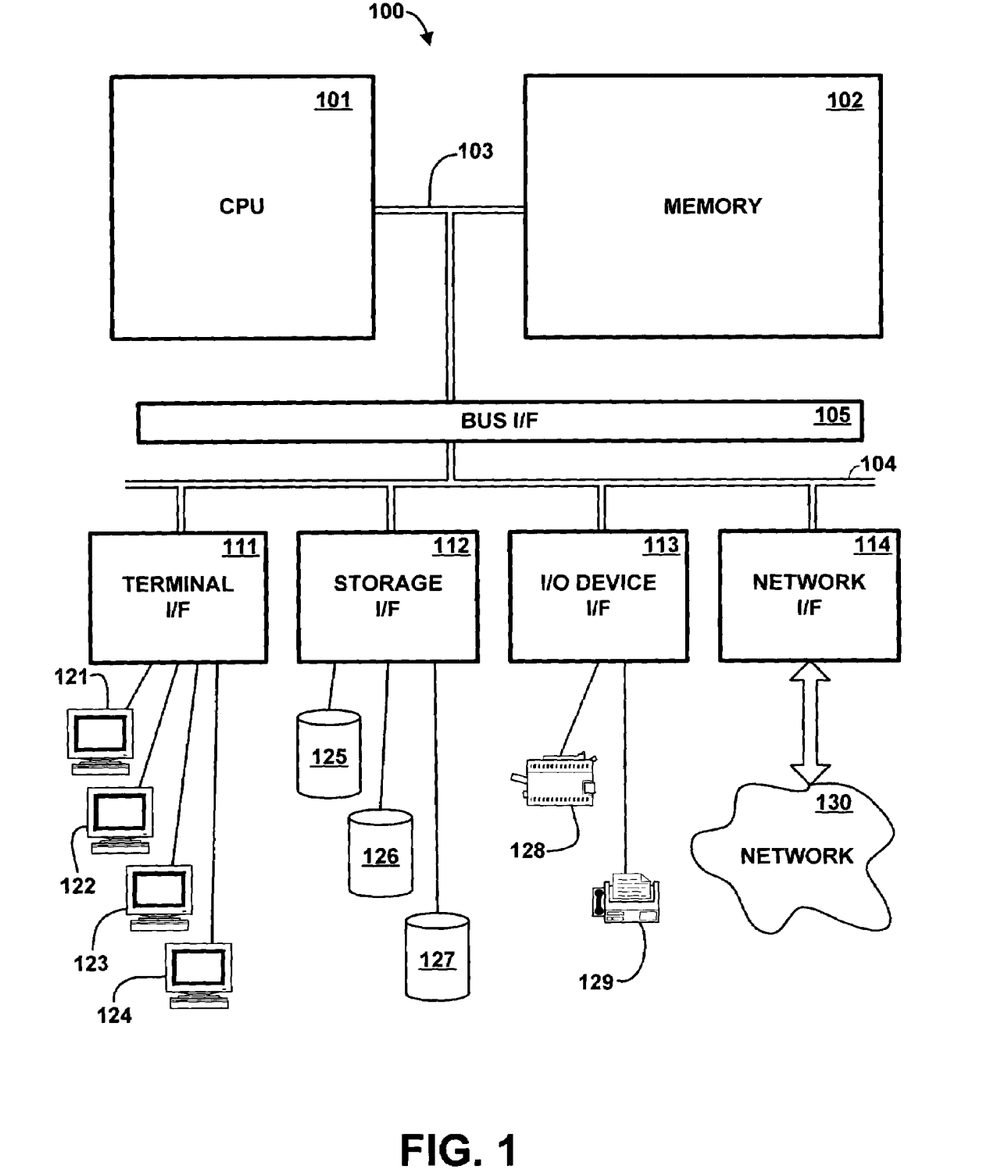
FIG. 1 is a high-level block diagram of the major hardware components of a computer system utilizing a multi-level register file, according to the preferred embodiment of the present invention.

Referring to the Drawing, wherein like numbers denote like parts throughout the several views, FIG. 1 is a high-level representation of the major hardware components of a computer system 100 utilizing a multi-level register file, according to the preferred embodiment of the present invention. The major components of computer system 100 include one or more central processing units (CPU) 101A-101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and data are loaded into cache memory 106 from main memory 102 for processing. Main memory 102 is a random-access semiconductor memory for storing data and programs. Although main memory 102 and cache 106 are represented conceptually in FIG. 1 as single entities, it will be understood that in fact these are more complex, and in particular, that caches typically are divided into multiple different levels and functions.

Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
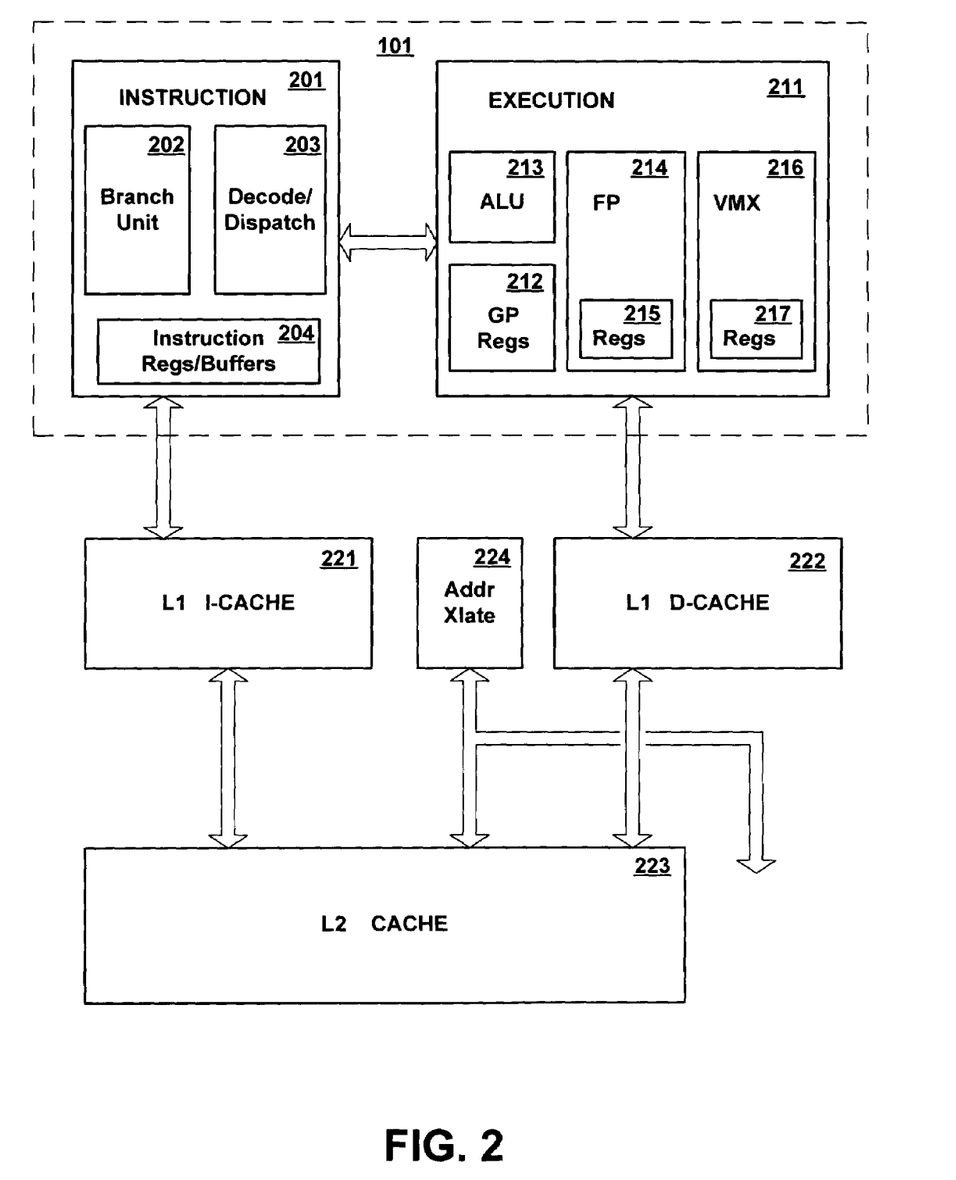
FIG. 2 is a high-level diagram of the major components of a CPU and associated caches in the computer system of the preferred embodiment.

FIG. 2 is a high-level diagram of the major components of CPU 101 including certain associated cache structures, according to the preferred embodiment, showing CPU 101 in greater detail than is depicted in FIG. 1. CPU 101 includes instruction unit portion 201 and execution unit portion 211. Also shown in FIG. 2 are Level 1 Instruction Cache (L1 I-Cache) 221, Level 1 Data Cache (L1 D-Cache) 222, Level 2 Cache (L2 Cache) 223, and Address Translation unit 224. In general, instruction unit 201 obtains instructions from L1 I-cache 221, decodes instructions to determine operations to perform, and resolves branch conditions to control program flow. Execution unit 211 performs arithmetic and logical operations on data in registers, and loads or stores data from L1 D-Cache 222. L2 Cache 223 is a level 2 cache, generally larger that L1 I-Cache 221 or L1 D-Cache 222, providing data to L1 I-Cache 221 and L1 D-Cache 222. L2 Cache 223 obtains data from a lower level cache (e.g. L3 cache) or main memory, through an external interface.

Caches at any level are logically at extension of main memory 102 (unlike registers). However, some caches are typically packaged on the same integrated circuit chip as the CPU, and for this reason are sometimes considered a part of the CPU. In the preferred embodiment, two CPUs 101, along with certain cache structures, are packaged in a single semiconductor chip, and for this reason CPU 101 is sometimes referred to as a "processor core" or "CPU core", to distinguish it from the chip containing a pair of CPUs. Each CPU 101 has its own dedicated L1 I-Cache 221 and L1 D-Cache 222. However, L2 Cache 223 is shared between the two processors on the same chip. The representation of FIG. 2 is intended to be typical, and is not intended to limit the present invention to any particular physical or logical cache implementation. It will be recognized that processors and caches could be designed according to different arrangements, and the processor chip or chips may include more caches or fewer caches than represented in FIG. 2.

Instruction unit 201 comprises branch unit 202, instruction decode/dispatch unit 203, and instruction registers and buffers 204. Instructions from L1 I-cache 221 are loaded into buffers 204 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 203 selects one or more instructions to be dispatched for execution from one or more of buffers 204 in a current machine cycle, and decodes the instruction(s) to determine the operation(s) to be performed or branch conditions. Branch unit 202 controls the program flow by evaluating branch conditions, and refills buffers 204 from L1 I-cache 221.

Execution unit 211 comprises a set of general purpose registers 212 for storing data and a scalar arithmetic logic unit (ALU) 213 for performing arithmetic and logical operations on data in GP registers 212 responsive to instructions decoded by instruction unit 201. Execution unit further includes floating point operations subunit 214, and a special vector execution subunit called a Vector/SIMD Multimedia Extension (VMX) execution subunit 216 (herein referred to as a vector execution subunit, or VMX subunit, for short; "SIMD" being a well known acronym for Single Instruction, Multiple Data). Floating point subunit 214 is a special floating point hardware pipeline for performing floating point operations using double-precision (64-bit) operands. Vector execution subunit 216 performs certain vector operations in parallel. The structure and operation of the VMX subunit 216 is described in greater detail herein. Although referred to herein as a vector execution subunit, this is merely descriptive of potential capability. In fact, subunit 216 simply performs mathematical operations on data, and can be used for any or various applications requiring mathematically intensive operations. Floating point subunit 214 and VMX subunit 216 each includes its own set of registers 215, 217. In addition to components shown in FIG. 2, execution unit 211 may include additional special purpose registers and counters, control hardware, and so forth. In particular, execution unit 211 may include execution pipelines (not shown) in addition to integer ALU 213, floating point subunit 214, and VMX subunit 216.

L1 I-cache 221 and L1 D-cache 222 are separate instruction and data caches providing data to instruction and execution units. L2 cache 223 is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 223, which in turn obtains it from an external location, and then transferred from L1 cache to the corresponding unit. Depending on the processor design, it may be possible to by-pass L1 cache and load data from L2 cache 223 to an execution or instruction register.

Address translation unit 224 translates effective addresses generated by instruction unit 201 or execution unit 211 to corresponding real addresses in memory. In the preferred embodiment, the processor generates "effective addresses" in an effective address space corresponding to each respective executing process. Effective addresses are translated to "virtual addresses" in a larger universal virtual address space, there being one virtual address space shared by all processes. The virtual addresses are further translated to "real addresses", corresponding to the actual memory locations at which the data is located. However, it will be understood that various computer architectures employ different addressing constructs, and the present invention is not limited to any particular form of addressing.

L1 I-Cache 221 and L1 D-Cache 222 are preferably addressed using effective addresses, and therefore no address translation is required for accessing the level 1 caches. However, the L2 Cache 223 and all memory below it are addressed using real addresses. Therefore, if it is necessary to access a lower level cache or main memory, an effective address generated by the processor is first translated to a real address.

Address translation unit 224 is represented as a single logical entity, but typically includes multiple tables and logic circuitry, which may be distributed in various chip locations. For example, an address translation mechanism may include a translation look-aside buffer, an effective-to-real address translation table, a segment table, and additional structures. Additionally, separate structures could be used for translation of instructions and for non-instruction data.

In the preferred embodiment, CPU 101 is a multithreaded processor supporting the concurrent execution of multiple threads and simultaneous dispatching of instructions from different threads in the same machine cycle. In the preferred embodiment, the concurrent execution of two independent threads is supported, it being understood that this number may vary. Each instruction executed in CPU 101 performs a single primitive operation, such as a load, a store, an integer arithmetic or logical operation using operands from GP registers, a complex operation using either floating point subunit 214 or VMX subunit 216, or a branch. Decode/dispatch unit 203 can simultaneously dispatch multiple such instructions in a single machine cycle, although it should be understood that, the execution units being pipelined, the actual execution of instructions may overlap those dispatched in different cycles.

In order to support concurrent execution of multiple threads, a separate set of most registers exists for each thread. I.e., a separate set of general purpose registers 212, floating point registers 215, and vector registers 217, exists for each thread. Additionally, certain other state or special purpose registers (not shown) may be duplicated to support multiple active threads. The execution unit pipeline hardware, the instruction unit, and the caches are shared by all threads.

Unlike memory and caches of memory, registers are accessed using a relatively small register identifier directly from an instruction. Register identifiers are generally assigned by a compiler (although in some cases, the programmer specifies them), and thus they are part of the compiled executable code. The size of the available register set is a fundamental parameter of every compiler, which will attempt to optimize code within the hardware constraints. The register identifier identifies registers which physically exist and are available for use in the processor.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU 101 may have a simple or complex instruction set.

Vector execution subunit 216 performs various operations in parallel on multiple data. Each instruction decoded by instruction unit 201 contains a single operation code specifying an operation, and potentially multiple operand specifiers. A subset of the instruction set for processor 101 includes instructions which are executed by VMX subunit 216. In the preferred embodiment, the vector execution subunit 216 contains various functional pipelines for performing various vector moves, arithmetic, logical and/or floating point operations. Each functional pipeline is a structured as a 128-bit wide pipeline which performs the same operation on multiple data values in parallel, it being understood that the width of the pipelines could vary. Typically, a pipeline performs an operation on four 32-bit values in parallel. However, for at least some pipelines and some operations, the length of the data values vary. For example, some operations may be performed on eight 16-bit values in parallel, or on sixteen 8-bit values in parallel. Each instruction for pipelines in VMX 216 contains a single operation code applicable to all 128 bits of data. Each instruction further specifies the sources and destinations of data in vector registers 217. In the preferred embodiment, an instruction may contain as many as three operand source specifiers and a single destination specifier, which refer to 128-bit registers in vector register file 217. The operation specified in the instruction implies how the 128-bit register data is to be allocated (i.e., values of 32, 16 or 8 bits in length). The same operation is then performed separately and in parallel using each of the implied values contained in the 128-bit operand registers. It would alternatively be possible to design operation codes which are used to specify a fixed, pre-defined set of operations for the pipelines corresponding to their respective positions, where not all of the operations are the same.

In the preferred embodiment, the vector registers 217 for the vector execution subunit 216 have a two-tier structure, in which a portion of the register data is contained in a local vector register file which is physically close to the inputs to the vector execution subunit pipeline inputs, and the complete register data is contained in a full vector register file, which is physically located at a greater distance to alleviate or remove physical placement congestion constraints.

Figure 3:
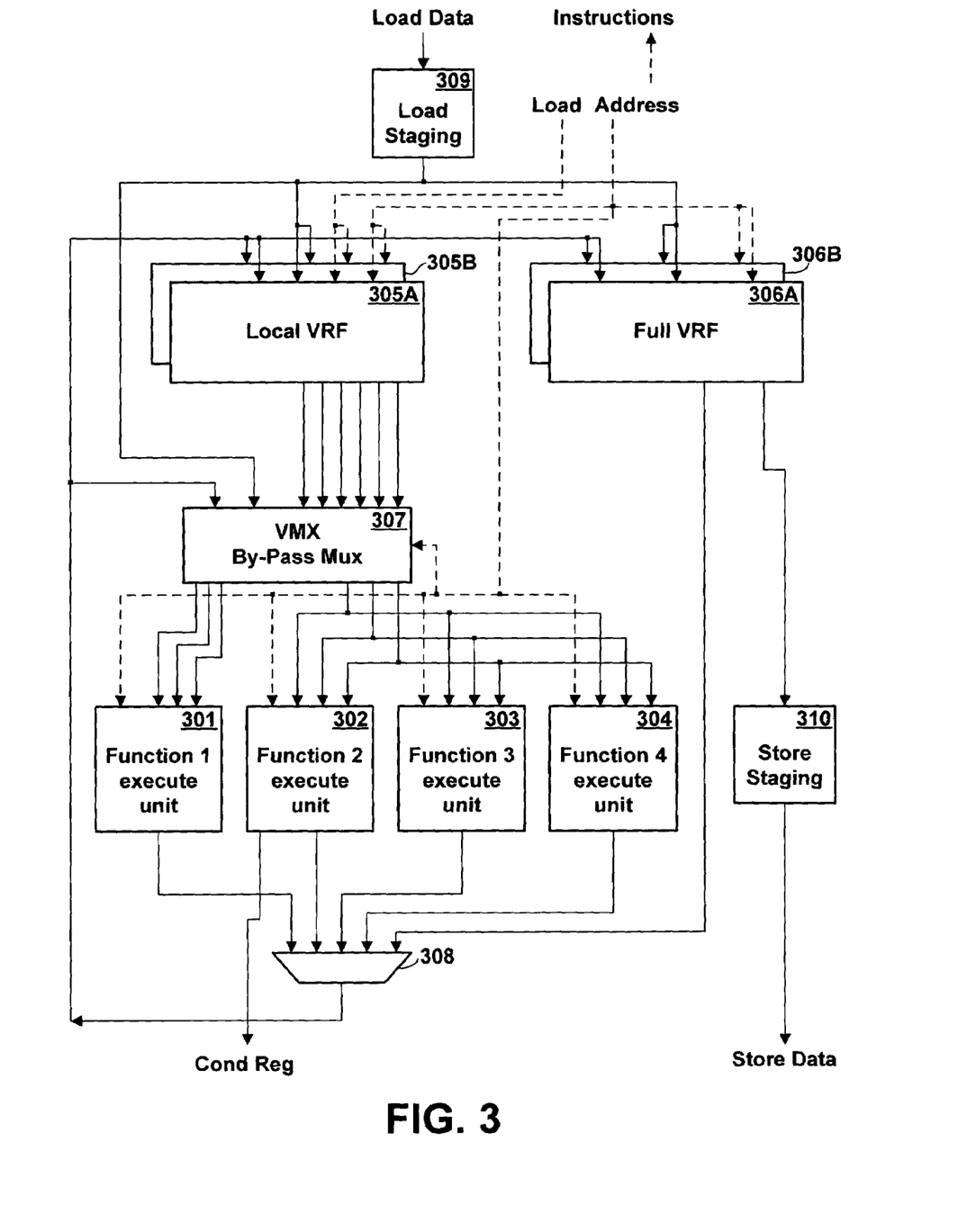
FIG. 3 is a high-level functional view of a Vector/SIMD Multimedia Extension (VMX) execution subunit of a CPU, having a multi-level register file, according to the preferred embodiment.

FIG. 3 is a high-level functional view of the vector execution subunit 216 within execution unit 211, according to the preferred embodiment. Referring to FIG. 3, vector execution subunit 216 includes four function execution units 301-304, each of which performs a respective set of functions on vector data, local register files 305A, 305B (herein generically referred to as feature 305), full register files 306A, 306B (herein generically referred to as feature 306), by-pass multiplexer 307, and result multiplexer 308, load staging unit 309, and store staging unit 310.

Local register file 305 generally holds the operands upon which the function execution units operate, and contain a portion of the data in full register file 306. By-pass multiplexer 307 contains latches and bus routing logic which routes data from a source, such as local register file 305 or result multiplexer 308, to a destination, such as the function execution units. Function execution units 301-304 perform the actual operations on data according to instructions from the instruction unit 201. Result multiplexer 308 receives and selects the outputs of function execution units as input to by-pass multiplexer 307, the local register file 305 and the full register file 306. Load staging unit 309 receives data loaded from memory (i.e., generally from L1 D-Cache 222, although it may be possible to by-pass the L1 D-Cache and load directly from a lower level cache). Store staging unit 310 temporarily holds data for storing to memory (i.e., to L1 D-Cache 222).

Each function execution unit 301-304 is an execution pipeline which performs a respective set of functions on vector data. Each function execution unit can receive up to three 128-bit register inputs in a given cycle. Each 128-bit register represents multiple operand values, the length of each value and number of values in the 128-bit register being implied by the operation to be performed. For example, if an instruction assumes 32-bit operands, then the function execution unit performs in parallel the operation using four sets of 32-bit operands, in which each set of 32-bit operands could have as many as three source operands and one destination operand. Each function execution unit is different and performs a different set of functions, the function initiated in any one cycle being the same for all sets of operands in the function execution unit. E.g., a single function execution unit might perform a set of functions such as integer add, integer subtract, bit-wise AND, bit-wise OR, etc. In a given pipeline input cycle, control logic (not shown) selects a function of the set of functions available to be performed, and one or more input registers in by-pass multiplexer 307, each input register containing 128 bits representing multiple operands (e.g., four parallel 32-bit operands). In the preferred embodiment, the function execution units include a vector permute unit, a vector simple integer ops unit, a vector complex integer ops unit, and a vector floating point ops unit. However, the number and functions of the function execution units may vary.

Figure 4:
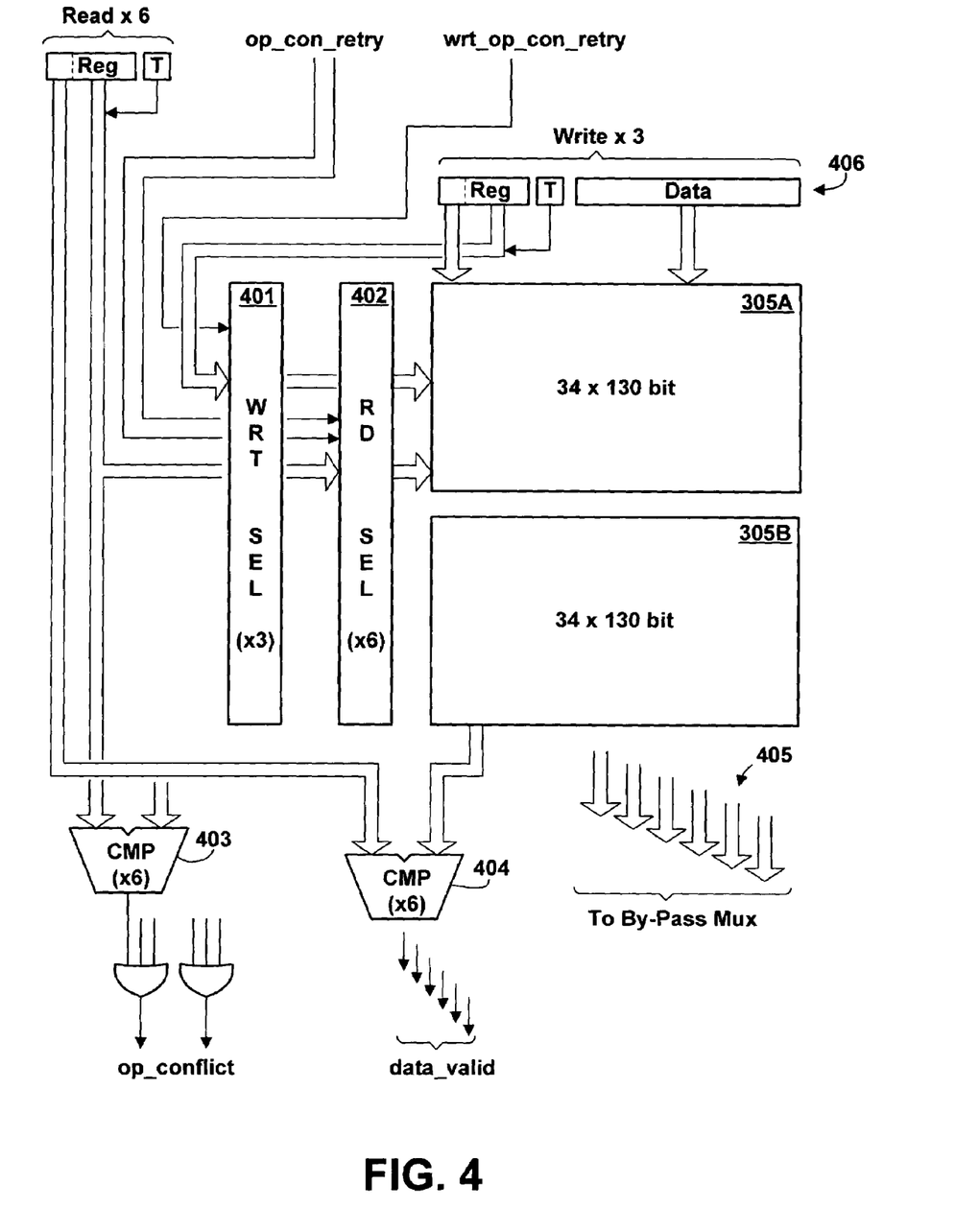
FIG. 4 shows in greater detail the structure of a local vector register file and certain associated logic, according to the preferred embodiment.
Figure 5:
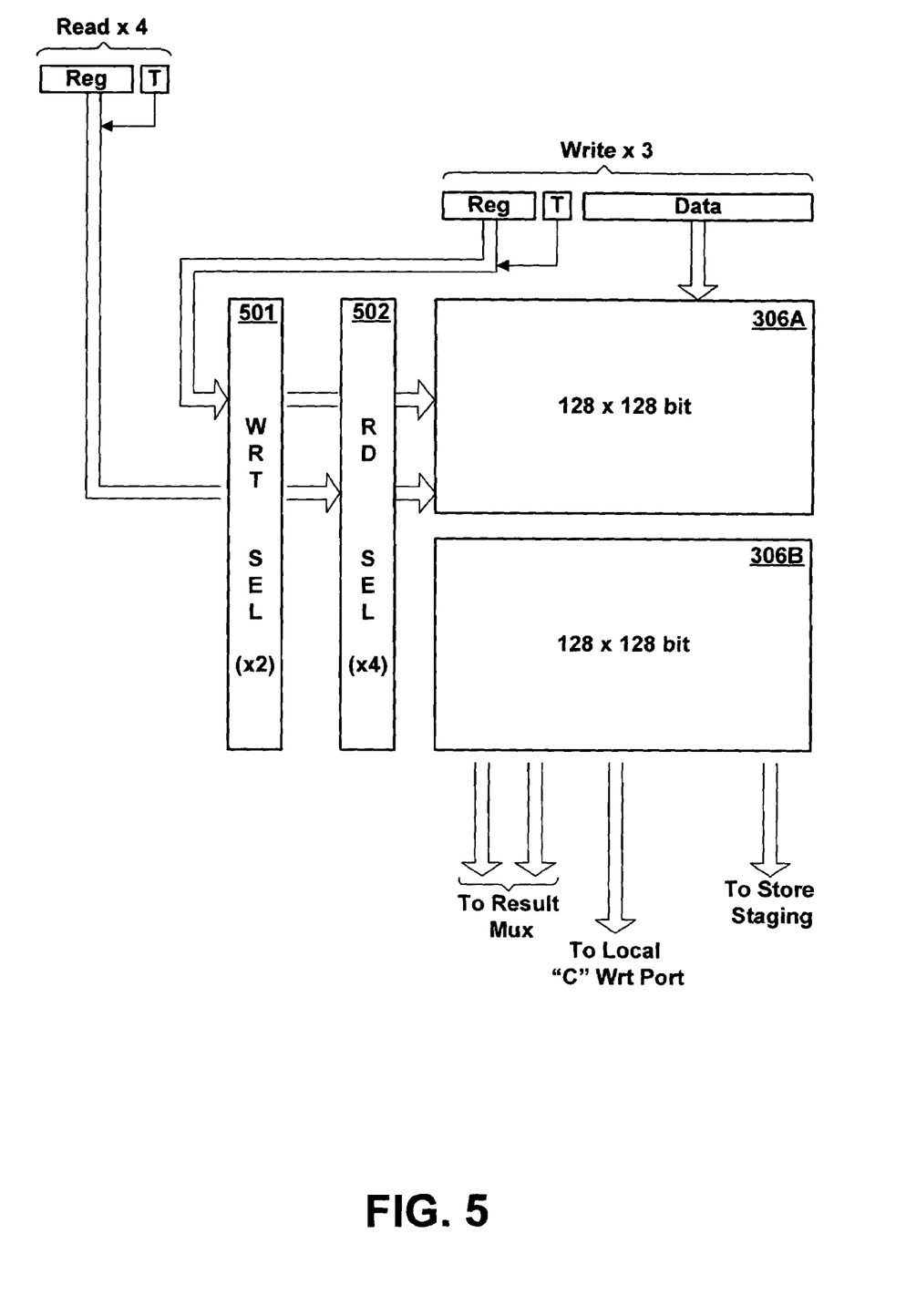
FIG. 5 shows in greater detail the structure of a full vector register file and certain associated logic, according to the preferred embodiment.

FIG. 4 shows in greater detail the structure of the local vector register files 305A, 305B, and certain associated logic. FIG. 5 shows in greater detail the structure of the full vector register files 306A, 306B, and certain associated logic. In this embodiment, two sets of vector register files exist, one corresponding to each active thread supported by the processor. A single thread identifier bit associated with each instruction determines whether the instruction references data in register file 306A or 306B.

Vector execution subunit 216 supports simultaneous read from up to six separate registers, and simultaneous write to up to three separate registers, in local vector register files 305A, 305B. Since each instruction may have as many as three source operands (and one destination operand), the vector execution subunit is designed to support two instructions issued in parallel in the same cycle. Generally, only a single operand is altered by any particular instruction, and so two parallel instructions requires only that two simultaneous writes be supported. The third write port is for loading data from cache or from the full vector register 306.

Each full vector register file 306 is a 128×128-bit register array, containing 128 registers, each of 128 bits. Each 128-bit register represents multiple data values, which are typically operated on in parallel by the function execution pipelines. Since the full register set includes 128 registers, registers are identified in the instruction set using a 7-bit identifier.

Each local vector register file 305 contains a portion of the data in the full vector register file. Each local vector register file is a 34×130-bit register array, containing 34 registers, each of 130 bits. Each 130-bit register comprises 128 bits of operand data (duplicating operand data in the full vector register file), and a 2-bit high-order register identifier. The five low-order bits of the 7-bit register identifier are used to select one of 32 registers in the local register file 305. The 2-bit high-order register identifier in each register in local file 305 contains the two high-order bits of the 7-bit register identifier, which are not used for selecting the register. These are necessary to confirm that the register selected corresponds to the correct register. The remaining two (of 34) registers in the local register file are used for operand conflicts, as explained further herein.

In operation, a local register file 305 is read by inputting a thread identifier bit and low-order 5-bit portion of the register identifier (from the instruction) to read select logic 402. Read select 402 is a decoder which selects a single register of the local register files 305A, 305B, responsive to the input. In the preferred embodiment, six copies of read select logic 402 exist, each corresponding to a respective read output port 405. The six copies of read select logic and six read ports are shared by both local register files 305A, 305B. The 128-bit operand data portion of the register is output on read output port to by-pass multiplexer logic 307. The 2-bit high order portion of the register identifier is output to comparator 404 (of which there are six copies, one corresponding to each read port). Comparator 404 compares the 2-bit high order portion of the register identifier in the 130-bit register with the 2-bit high order portion of the operand register identifier from the instruction. If the two are identical, then the correct register data has been read and the operation is allowed to proceed. If the two are not identical, an invalid data signal is generated by compare logic 404.

An invalid data signal in any of the operands of the instruction causes the instruction to be flushed from the function execution pipeline and retried after loading valid register data from the full register file 306. Thus, data is actually read speculatively from local register file 305, and provided to the by-pass multiplexer 307 (and from there to function execution units 301-304), before it can be verified that the data obtained from the local register file corresponds to the correct register. The register identifier bits are being compared in comparators 404 in parallel with routing the data in the by-pass multiplexer 307 to the appropriate function execution unit. If all operands for a particular instruction are valid, the instruction proceeds normally through the execution pipeline. If any operand is invalid, two actions occur in parallel: the required register data is transferred from full register file 306 to local register file 305; and the instruction with invalid data in the pipeline is flushed and the pipeline restarted. Access to the full register file and writing needed register data to the local register file can generally be accomplished sooner than flushing the pipeline, so the required data is generally available as soon as the pipeline can be flushed and restarted. In the preferred embodiment, comparators 404 trigger a general pipeline flushing mechanism (not shown), which can also be used for flushing the pipelines for other reasons (e.g., a speculative branch which is not taken), thus minimizing the additional logic required to support a multi-level cache.

Because each instruction may contain as many as three operands referring to three different registers, there is a possibility that two or more operands will conflict in the local register file. I.e., there is a possibility that two operands will reference registers having the same low-order 5-bit register identifier, but different high-order register identifier bits. In this case, it would be impossible to put both operands simultaneously in the same register of local register file 305. For this reason, the two additional registers (making a total of 34 registers) are provided in the local register file. When an instruction requiring a vector execution subunit operation is dispatched, the lower-order 5 bits of the register identifiers of the operands are compared to one another by compare logic 403, the paired comparisons being logically ORed. If any two operands have the same lower order 5 bits of register identifier, an operand conflict is signaled. The operand conflict produces a result similar to an invalid register data, i.e., the pipeline is flushed, and new operands loaded from the full register file 306. However, in the case of an operand conflict, all three operands are loaded to local register file 305. The "A" operand is loaded to its normal location among the 32 registers accessed by the 5-bit low order portion of the register identifier. The "B" and "C" operands are loaded to the $33^{rd}$ and $34^{th}$ registers, respectively. When the instruction is then retried, the operation conflict retry line (op_con_retry) is active, signaling the read select logic 402 to use the $33^{rd}$ and $34^{th}$ registers. When the op con retry line is active, the read select logic decodes the "A" operand normally, and decodes the "B" and "C" operands to reference the $33^{rd}$ and $34^{th}$ registers, respectively, regardless of the values of the register identifiers. A separate op_con_retry line input exists for each thread (i.e., for each register file 305A, 305B).

Since it is desirable to avoid such operand conflicts and consequent retries of the instruction, the compiler which generates executable code is optimally designed to avoid operand conflicts by assigning non-conflicting registers to operands in the same instruction. Assuming such a properly designed compiler is used, operand conflicts might never, or only very rarely, occur. However, the processor logic should be designed to accommodate conflicts in the event they do occur, as explained above.

Local register file 305 is written to by inputting a thread identifier bit and low-order 5-bit portion of the register identifier (from the instruction) to write select logic 401. Write select 401 selects a single register of the local register files 305A, 305B, responsive to the input. In the preferred embodiment, three copies of write select logic 401 exist, each corresponding to a respective write port 406, the write select logic and write ports being shared by both local register files 305A, 305B. The 2-bit high order portion of the register identifier is concatenated with the 128-bit operand data portion of the input, and together they are written to the 130-bit register selected by write select 401. A special wrt_op_con_retry control line is used to select the $33^{rd}$ and $34^{th}$ registers. I.e., as described above, when an operand conflict has been detected, all three operands of the instruction are obtained from the full register file, and are made available on the "A", "B" and "C" write ports. The wrt_op_con_retry line is then activated to the write select logic 401, causing the "A" write port data to be written to the local register selected by the low-order 5 bits of the register identifier, while the "B" and "C" write port data is written to the $33^{rd}$ and $34^{th}$ local registers, respectively, of the local register file corresponding to the thread identifier. Since there are only three write ports (only one instruction can be retried at a time), only a single wrt_op_con_retry line is required.

Similarly, in operation full register file 306 is read by inputting a thread identifier bit and the full 7-bit register identifier to read select logic 502. Read select 502 decodes and selects a single register of the full register files 306A, 306B, responsive to the input. In the preferred embodiment, four copies of read select logic 502 exist, each corresponding to a respective read output port, the read select logic and read output ports being shared by both full register files 306A, 306B. One of the read output ports provides data to store staging unit 310 (and thus data is always stored from the full register file). The remaining three read output ports feed data to the local register file 305.

Full register file 306 is written to by inputting a thread identifier bit and 7-bit register identifier to write select logic 501. Write select 501 selects a single register of the local register files 306A, 306B, responsive to the input. In the preferred embodiment, three copies of write select logic 501 exist, each corresponding to a respective write port, the write select logic and write ports being shared by both full register files 306A, 306B.

Figure 6:
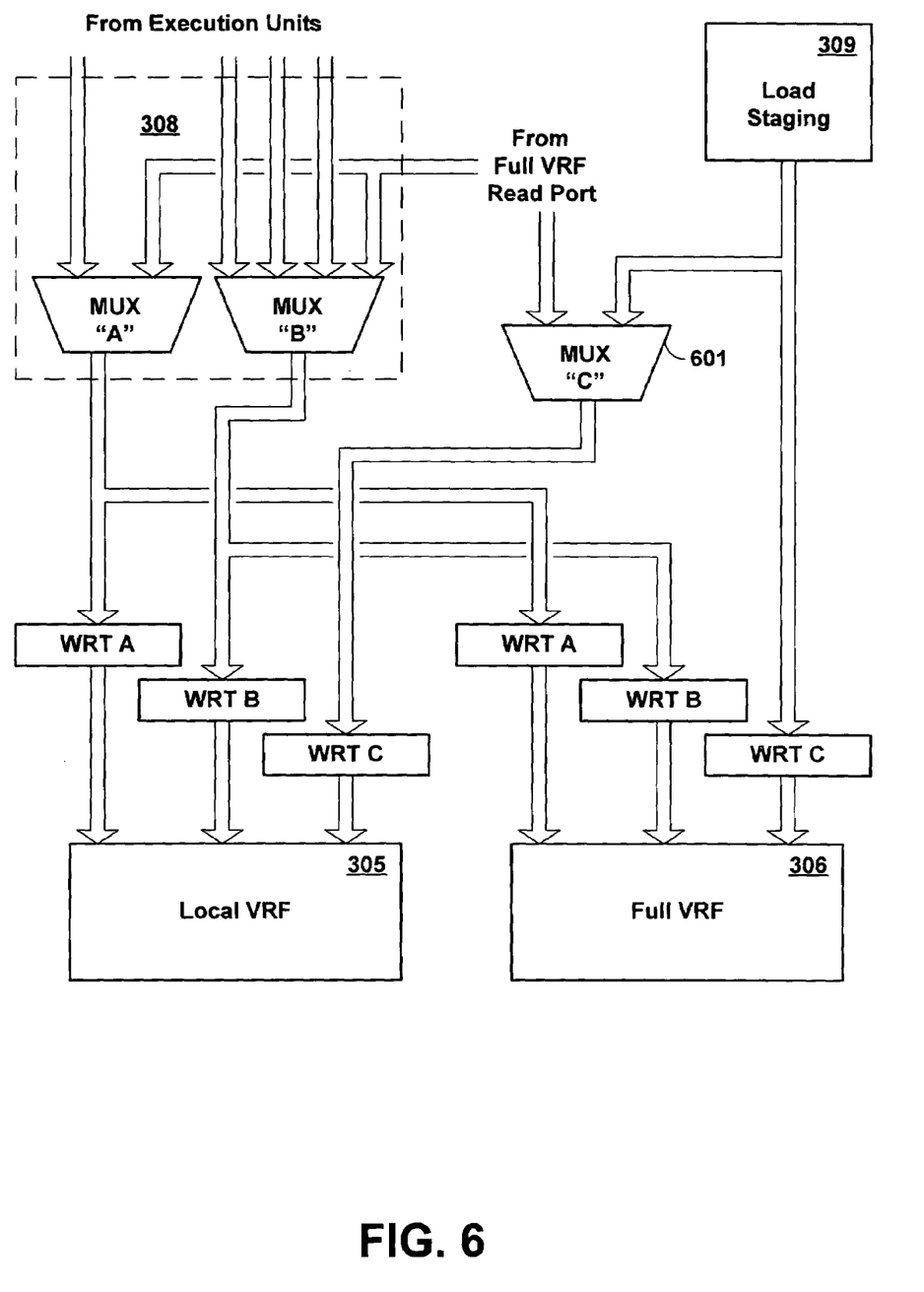
FIG. 6 represents the major hardware and data paths for writing data to the local vector register file and full vector register file, according to the preferred embodiment.

FIG. 6 represents the major hardware and data paths for writing data to the local and full register files 305, 306. As explained above, each of local register files 305 and full register files 306 has three write ports, which are herein designated "A", "B" and "C. Generally, the "A" and:"B" ports are used for writing results from the execution pipelines, while the "C" port is used for loading data. Additionally, in the local register file, all three ports can be used for copying data from the full register file.

In operation, data which is loaded from memory (specifically, L1 D-Cache 222) passes through load staging unit 309, and is written in parallel to the "C" write ports in both the full register file 306 and local register file 305. Data produced by the function execution units passes through result multiplexer 308, and is also written in parallel to both the full register file 306 and the local register file 305, using write ports "A" and "B". Thus, it is possible to simultaneously write two function execution unit results and one 128-bit data load to the two register files.

Where it is necessary to retry an instruction because one of the operands was not in the local register or an operand conflict was detected, data is read from the full register file and written to the local register file. It is possible to write up to three registers from the full register file in a single cycle; this is necessary in the case of an instruction having three operands, where there is an operand conflict or none of the operands is in the local register file. In this case, two of the read output ports from the full register file are input to result multiplexer 308, from which their data is routed to the "A" and "B" write ports of the local register file. A third read output port from the full register file is input to multiplexer 601, which selects between load data and data from the read output port; this data is then routed to the "C" write port of the local register file.

The local register file 305 maintains a partial copy of data in full register file 306, both register files maintaining current data at all times. Specifically, there is no "cast back" of changed data, as is often done in memory caches. Data which is changed (coming out of the function execution pipeline) is always written simultaneously to both the full register file and the local register file, so that both copies are current. If data is removed from the local register file (by overwriting a local register with the contents of a different register), no further action is necessary to update the full register file.

In operation, data representing a particular register remains in the local register file until it is overwritten with the contents of a different register. Data is overwritten either when it is loaded from cache memory (data being loaded simultaneously to both local and full register files), or when it is copied from the full register file as a result of an instruction which requires the data. Thus, the local register file may be considered a 1-way set associative copy of a portion of the full register, in which each local register (except for the $33^{rd}$ and $34^{th}$ registers, which are special cases) contains the most recently used register of a set of four registers having the same lower order 5-bit identifier.

Flushing the function execution pipeline to retry an instruction involves multiple lost clock cycles. If a sufficiently large proportion of the operands read from the local register file are invalid, causing the function execution pipeline to be flushed, the time lost in flushing the pipeline can erode or outweigh any performance gain from using the faster-access local register file. Therefore, a substantial majority of the register references should be satisfied from the local register file, the exact percentage required to maintain a performance benefit being dependent on various design parameters. Instructions executing in the vector execution subunit typically exhibit a high degree of repeatability, the same registers being referenced over again in predictable patterns. Therefore, it is expected that the desired proportion of register references satisfied from the local register file can be achieved. Optimally, the compiler will assign registers to minimize the occurrences of invalid operands and flushing the pipelines. Alternative design techniques for reducing or avoiding the occurrences of flushing are discussed below.

Although a particular structure of the register files, number of write ports, read ports, and associated hardware are illustrated and described herein, it will be understood that the number and type of such structures may vary. In addition to those variations disclosed above, the following variations in the design of a multi-level register file are possible within the scope of the present invention. These variations or alternatives are disclosed herein by way of example, and are not to be taken as limiting the scope of the present invention to the preferred embodiments and alternatives disclosed.

In the preferred embodiment, data from the local register file is provided speculatively to the execution pipelines in parallel with determining whether the requested operand register identifiers actually correspond to the register identifiers in the local register file, and the pipeline is subsequently flushed and restarted where the data is incorrect. The advantage of this approach is that it requires comparatively little additional hardware, since a mechanism to flush the pipeline for a variety of conditions is generally required anyway. However, it should be apparent that flushing the pipeline and restarting it causes greater delay than would have been caused by simply idling the pipeline until the correct data could be obtained from the full register file. For example, it is expected that access to the full register file would take one, or perhaps two, additional cycles, while flushing and restarting the pipeline requires seven or more cycles. Therefore, performance will be seriously degraded if a sufficiently large proportion of the register references are not in the local register file.

Two possible design alternatives could be employed to alleviate the burden of flushing pipelines. In a first alternative, the local register could be selectively disabled for certain instruction sequences which are deemed to have insufficient repeatability of register references. In a second alternative, it would be possible to construct logic (not shown) which would detect a data invalid condition at the beginning of the execution cycles, and idle the pipeline for one or two cycles to wait for data from the full register file.

Figure 7:
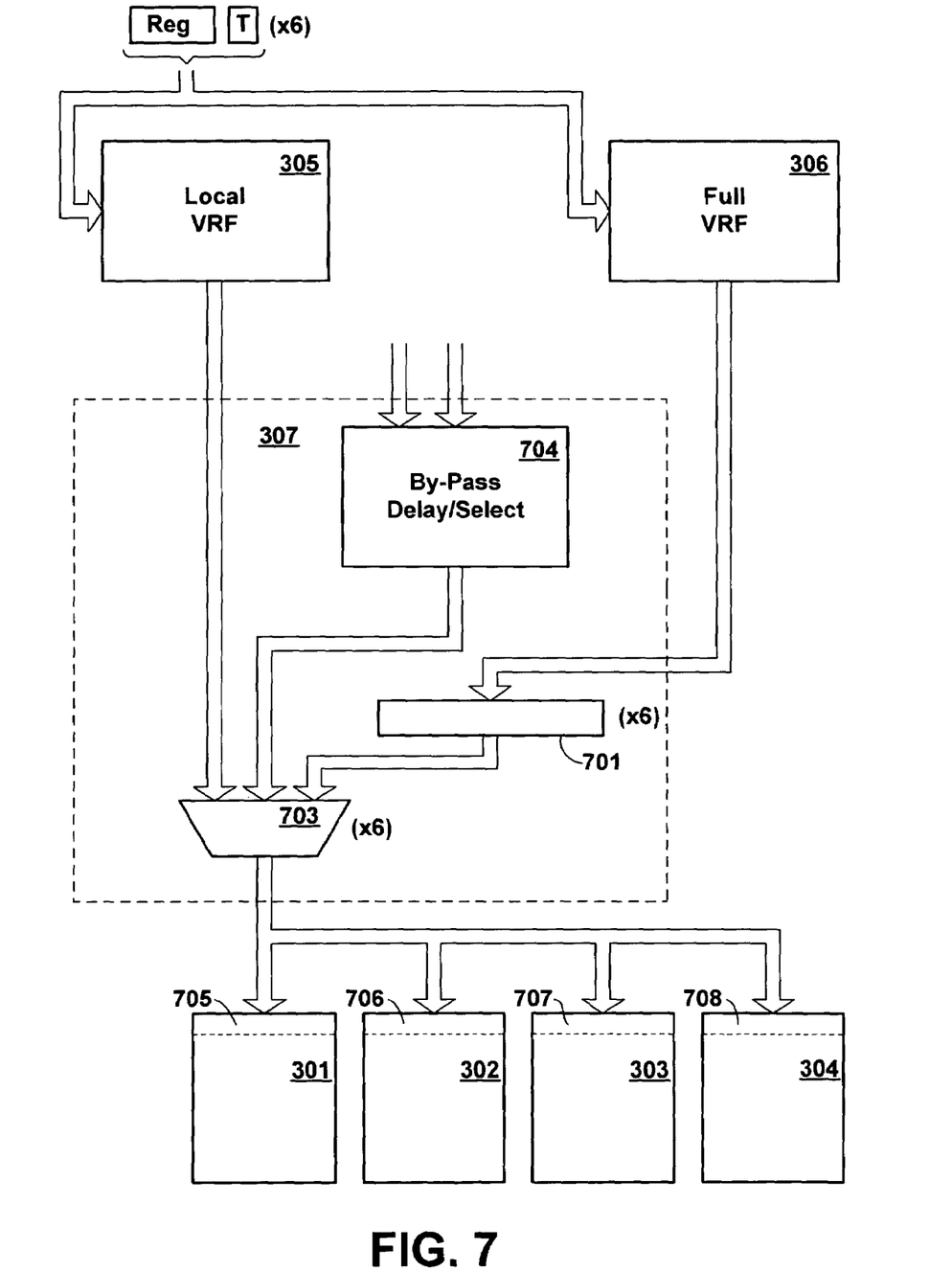
FIG. 7 represents certain major hardware and data paths for inputting data to the function execution pipelines, according to certain alternative embodiments.

Either of these two alternatives requires that it be possible to input data directly from the full register file to the function execution pipelines, without first storing it in the local register file. FIG. 7 represents certain major hardware and data paths for inputting data to the function execution pipelines, according to these alternative embodiments.

Referring to FIG. 7, in either alternative the full register file 306 would have at least the same number of read ports (preferably six) as the local register file 305. A dual read register identifier path provides the read register identifier in parallel to both local register file 305 and full register file 306. Since the access time for the full register file is longer, at least one latch register 701 would be required in the output path from each of the six read ports of the full register file; the number of such latch registers required in each output path is equal to the cycle delay between local register access and full register access, the delay being preferably one cycle. Multiplexer 703 (of which there are six, one corresponding to each read port) within by-pass logic 307 would select the output of the local register file or the full register file for input to respective input latch registers 705-708 at the input to each function execution unit pipeline 301-304. Each function execution pipeline preferably contains three input latch registers corresponding to the maximum of three input operands for each operation. By-pass logic 307 further contains by-pass delay/select logic 704, which receives input from result multiplexer 308, and optionally other sources, has the capability to delay an output for several cycles, and selects an output for multiplexer 703. It is notable that, because multiplexer 703 is already required to select one of several inputs to latch registers 705-708, no additional multiplexers are require to support the addition of the data path from the full register file 306 to latch registers 705-708, i.e., the additional support required for the data path from the full register file does not require the interposition of an additional gate delay in the data path from local register file 305 to latch registers 705-708.

In the first alternative embodiment, control logic (not shown) controls multiplexer 703 to selectively disable local register file 305 by selecting data from full register file 306. Since all register data is in the full register file, there will never be a need to flush and restart the pipeline as a result of invalid data in the selected register when the local register file is thus disabled. Disabling of the local register file could be performed in response to any of various conditions. For example, control logic could dynamically monitor the rate of invalid data detected in local register references for each executing thread. The local register file would be enabled for a particular thread when the thread is dispatched to the processor. If the monitored rate of invalid data in local register references for a particular thread exceeds some pre-determined design threshold, the local register file would be disabled. A simple and efficient monitoring means is a single up-or-down counter for each thread, which is incremented by a first amount for each instruction referencing valid data in the local register, and decremented by a second amount for each instruction referencing invalid data (which must therefore be retried). The ratio of the amount of increment to decrement corresponds to the desired design threshold rate of invalid data, so that a counter which consistently falls below zero indicates excessive re-trying of instructions due to invalid data in the local register file. As an alternative to dynamic monitoring, a compiler might be able to predict whether sufficient repeatability of register references exists, and set a programmable context flag to disable the local register file accordingly.

In the second alternative embodiment, the control logic would detect and respond to invalid data conditions for each individual instruction, in parallel with reading the data and moving it through certain registers. An exemplary description of a read operation for such an alternative follows. At cycle N (after dispatching and decoding an instruction), all register identifiers referenced in an instruction would be transmitted in parallel to both local register file 305 and full register file 306. Both register files would output concurrently. The output of the local register file would pass directly through multiplexer 703 to a selected one of input latch registers 705-708 at cycle N+1. The full register file having a longer access latency, would hold its output in latch register 701 at cycle N+1. By the end of cycle N+1, control logic would determine whether the local register data was valid, and provide this information to latches or other logic controlling the operation of the function execution units and by-pass multiplexer. If the local register data was valid, the operand data in the selected one of latch registers 705-708 would proceed to the first stage of the corresponding function execution unit at cycle N+2. If the local register data was not valid, the function execution unit would be idled for one cycle at cycle N+2, and the full register file data (now in latch register 701, assuming 2-cycle access time) would be allowed to pass through multiplexer 703 and be loaded into the corresponding one of latch registers 705-708; the operand data would then proceed to the first stage of the appropriate function execution unit at cycle N+3. An operand conflict would be treated in the same manner, so that the two extra registers in the local register file would be unnecessary.

In the preferred embodiment, the processor contains a set of general purpose registers 212 which are used by the general purpose ALU 213, a separate set of floating point register 215 used by floating point subunit 214, and a separate set of vector registers 217 used by vector execution subunit 216. As described herein, only the vector registers 217 are designed as multi-level register files, the floating point registers 215 and general purpose registers 212 being conventional in their design and smaller in size. This design choice is made partly due to the large size of the vector registers, and partly the expectation that vector registers will exhibit a highly stable reference pattern (the same registers typically being accessed repeatedly), resulting in relatively few instruction retries. However, it would alternatively be possible to employ a multi-level general purpose register file and/or a multi-level floating point register file, or a multi-level register file supporting some other form of functional unit. Even where the reference pattern is less stable, such a design may be useful if the performance consequences of a required register missing from the local register file can be reduced, as further discussed in the alternatives above. In addition, a processor might be designed with a different allocation of functions; it might have only a single set of registers which feed all execution pipelines, or might have additional sets of registers and functional units not described herein.

In the preferred embodiment, the local register file is essentially 1-way set associative, providing only a single local register for a given subset of the full register file. Such a structure simplifies the hardware required to access and maintain the data in the local register file, as only the most recently referenced register of a subset is kept in the local register file. A simplified hardware structure has important advantages of speed of access to the local register file, which is preferably a single cycle. However, it would alternatively be possible to use an N-way associative local register file, in which the processor determines which registers to keep in the local register file based on least recently used bits or other techniques, as are known in the art of cache memories. Use of such techniques may reduce the probability that a given operand will not be in the local register file, but may also involve multiple access cycles.

In the preferred embodiment, all registers in the local register file are duplicated, the relatively remote register file ("full register file) containing a complete copy of all register data. Duplicating the registers requires additional chip area for the register cells themselves, but considerably simplifies the control logic. In an alternative embodiment, it would be possible to employ a non-duplicated local register file, and a remote register file which does not duplicate the local register file, in which the local register contains the only copy of its register data. In this embodiment, it would be necessary to swap out the contents of a local register to a more remote register whenever new data is being introduced in the local register. Although the relatively remote register is called the "full" register herein, this is merely intended to reflect the fact that in the preferred embodiment it contains a complete copy of the register data, and is not intended as a limitation on the scope of the present invention.

Although a specific embodiment of the invention has been disclosed along with certain alternatives, it will be recognized by those skilled in the art that additional variations in form and detail may be made within the scope of the following claims:

What is claimed is:

1. A digital data processing device, comprising:
   instruction logic which selects and decodes instructions for execution;
   execution logic which performs operations specified by said instructions;
   a plurality of registers storing register data which is referenced using register identifiers from said instructions, said plurality of registers being organized as a plurality of levels, including:
   (a) a first level having a first access latency time and a first number of registers; and
   (b) a second level having a second access latency time and a second number of registers, said second access latency time being longer than said first access latency time, said second number of registers being greater than said first number of registers, register data contained in said registers of said first level being a subset of register data contained in said registers of said second level;
   wherein at least some said instructions specify multiple registers of said second level, each specified register containing a respective operand for performing the respective operation specified by the respective instruction;
   wherein each register of a first subset of said first level of registers is for storing the contents of a register of a corresponding subset of a plurality of discrete subsets of registers of said second level, said corresponding subset of registers containing a plurality of registers of said second level, said first subset of registers of said first level containing a plurality of registers; and wherein each register of a second subset of said first level of registers is for storing an operand contained in a register of said second level specified by a first instruction of said at least some instructions specifying multiple registers of said second level, wherein the first instruction specifies multiple registers of the same subset of said plurality of discrete subsets of said second level, said second subset of registers of said first level containing at least one register, said first and second subsets of said first level being discrete.

* * * * *